United States Patent [19]

Heep et al.

[11] Patent Number: 4,946,078
[45] Date of Patent: Aug. 7, 1990

[54] APPARATUS FOR FEEDING BULK MATERIAL

[75] Inventors: Dieter Heep, Bergatreute; Paul Vogel, Weingarten; Joachim Schmalz, Ravensburg, all of Fed. Rep. of Germany

[73] Assignee: Waeschle Maschinenfabrik GmbH, Ravensburg, Fed. Rep. of Germany

[21] Appl. No.: 280,706

[22] Filed: Dec. 6, 1988

[30] Foreign Application Priority Data

Dec. 15, 1987 [DE] Fed. Rep. of Germany ....... 3742522

[51] Int. Cl.⁵ ............................................. B65G 29/00
[52] U.S. Cl. ................................... 222/368; 222/542; 414/189; 414/220; 414/301
[58] Field of Search .............. 222/368, 367, 333, 542; 414/219, 220, 158, 189, 195, 211, 301

[56] References Cited

U.S. PATENT DOCUMENTS 2,492,460 12/1949 Botelho ............................... 414/220
4,180,188 12/1979 Aonuma et al. ..................... 222/368

FOREIGN PATENT DOCUMENTS 843384 10/1951 Fed. Rep. of Germany .

*Primary Examiner*—Michael S. Huppert
*Assistant Examiner*—David H. Bollinger
*Attorney, Agent, or Firm*—Henry M. Feiereisen

[57] ABSTRACT

A rotary feeder includes a housing which accommodates a rotor extending between two lateral disk members. Bearing against the peripheral area of each disk member is a slide ring which is acted upon by a pressure fluid with a constant holding force by which the slide ring is pressed against the associated disk member. Thus, the axial sealing of the rotor within the housing is independent of the wear of the slide ring. In addition to the holding pressure, the slide rings may also be subjected to a momentary displacement force which exceeds the holding force and ensures that the slide rings overcome frictional forces in the area of their guides.

16 Claims, 2 Drawing Sheets

APPARATUS FOR FEEDING BULK MATERIAL

BACKGROUND OF THE INVENTION

The present invention refers to an apparatus for feeding bulk material, in particular to a rotary feeder of the type including a housing provided with a top inlet and a bottom outlet and accommodating a cellular rotor which includes a plurality of radial vanes fixed on a shaft which is supported in lateral bearing covers.

In a rotary feeder of this type, the vanes of the rotor radially extend from the shaft to the inner wall surface of the housing and are confined in axial direction by circular lateral disk members. Bearing against the peripheral area of the lateral disk members at their end face which faces the adjacent bearing cover is a slide ring which is guided for axial displacement in the respective bearing cover in non-rotational manner. Both slide rings are made of polytetrafluoroethylene and seal chambers defined between the lateral disk members of the rotor and the respective bearing cover against penetration of dusty particles of the bulk material. Further, the slide rings prevent leakage of air through these chambers which would otherwise occur in view of the differential pressure between the inlet side and the outlet side of the rotary feeder.

The slide rings are urged against the lateral disk members by several prestressed helical compression springs which are supported by and uniformly spaced about the circumference of the respective bearing covers. Practice has shown that the frictional conditions and the forces exerted in the area of the sliding surfaces of slide ring and side disk are difficult to predict and to calculate in advance because of their dependency on numerous, partly time-varying parameters such as material of slide ring and side disk, pressure differential between inlet and outlet of the rotary feeder or wear condition of the slide ring. Further, the compression springs cause a local flexure of the slide rings in their contact area with the latter.

More importantly, however, an increasing wear of the slide rings results in a decreasing prestress of the compression springs and thus in a decrease of the contact pressure of the slide rings against the lateral disk members. Since for reasons of long service life of the slide rings e.g. or more than one year, it is generally desired to set the initial contact pressure at a level which does not exceed the pressure required for attaining a sufficient sealing action, this sealing action deteriorates with increasing wear during operation of the rotary feeder.

Although a decreasing prestress of the compression springs may be avoided through manual readjustment at regular e.g. monthly intervals, the need for additional readjusting mechanisms considerably complicates the structure of the rotary feeder and also increases maintenance thereof. Therefore, the contact pressure of the slide rings is frequently set at a higher level exceeding the level for optimum sealing when the rotary feeder comes from the production line. A higher contact pressure, however, results in increased wear and thus in shortened service life of the slide rings.

SUMMARY OF THE INVENTION

It is thus an object of the present invention to provide an improved rotary feeder obviating the afore-stated drawbacks.

This object and others which will become apparent hereinafter are attained in accordance with the present invention by subjecting each of the slide rings to a constant, path-independent holding force by which the slide rings are pressed against the lateral disk members and which is thus independent of wear of the slide rings.

By subjecting the slide rings to a path-independent, constant holding force which is uniformly distributed over the circumference of the slide rings, the axial sealing of the rotor is considerably enhanced without requiring manual readjustment during progressing wear of the slide rings. Preferably, the holding force is provided by a pressure fluid which is supplied by a pressure source via a suitably set pressure regulator.

According to a further feature of the present invention, the slide rings are contained in an axial groove of the bearing covers. Defined between the groove base of the axial groove and the sllide ring at the end face thereof facing the bearing covers is an annular space in which the pressure fluid is admitted to act upon the slide rings with the optimum holding force.

According to yet another feature of the invention, each slide ring is prevented from a rotational movement by a locking mechanism which includes a bolt screwed with its forward section into the slide ring. With its remaining section, the bolt protects through the respective bearing cover toward the outside and thereby allows by way of its position an indication of wear of the pertaining slide ring. In order to avoid an undesired pressure relief of the slide rings in the area where the bolt is screwed in, the outwardly projecting section of each bolt is encased by a transparent cap so that the bolt is acted upon by the same pressure as the associated slide ring.

Advantageously, the rearward end of the bolt is provided with a stop member which may run against a shoulder of an external support for the bolt so as to limit a further axial displacement or stroke of the slide ring and to indicate the worn out condition of the latter.

Suitably, the holding force should be set at a level which ensures that frictional forces which oppose the holding force and act between the slide rings and their guides in the bearing covers are sufficiently overcome. Since the magnitude of these frictional forces cannot be determined in advance, a safety factor should be added to the calculated value. It should also be taken into consideration that the frictional forces increase during the course of the operation due to unavoidable penetration of small dust particles into the guides of the slide rings. Therefore, during initial run of the rotary feeder, the holding force exerted on the slide rings is slightly higher than the optimum value so that wear may slightly be increased but still is considerably smaller than in known rotary feeders of this type.

This initially increased wear may, however, be avoided when, in accordance with a further feature of the present invention, the slide rings are subjected at regular intervals to a momentary displacement or readjustment force which is considerably higher than the constant holding force which corresponds to the predetermined contact pressure and by which the slide rings are urged against the housing. By subjecting the slide rings periodically to such a displacement force, the holding force can be maintained at a lower level i.e. at a level which corresponds to the optimum contact pressure. The provision of such a displacement force ensures that the frictional forces (static friction) opposing the readjustment of the slide rings are overcome and since the displacement force is only momentarily applied, the thus momentarily increased contact pressure does not cause any increased wear.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
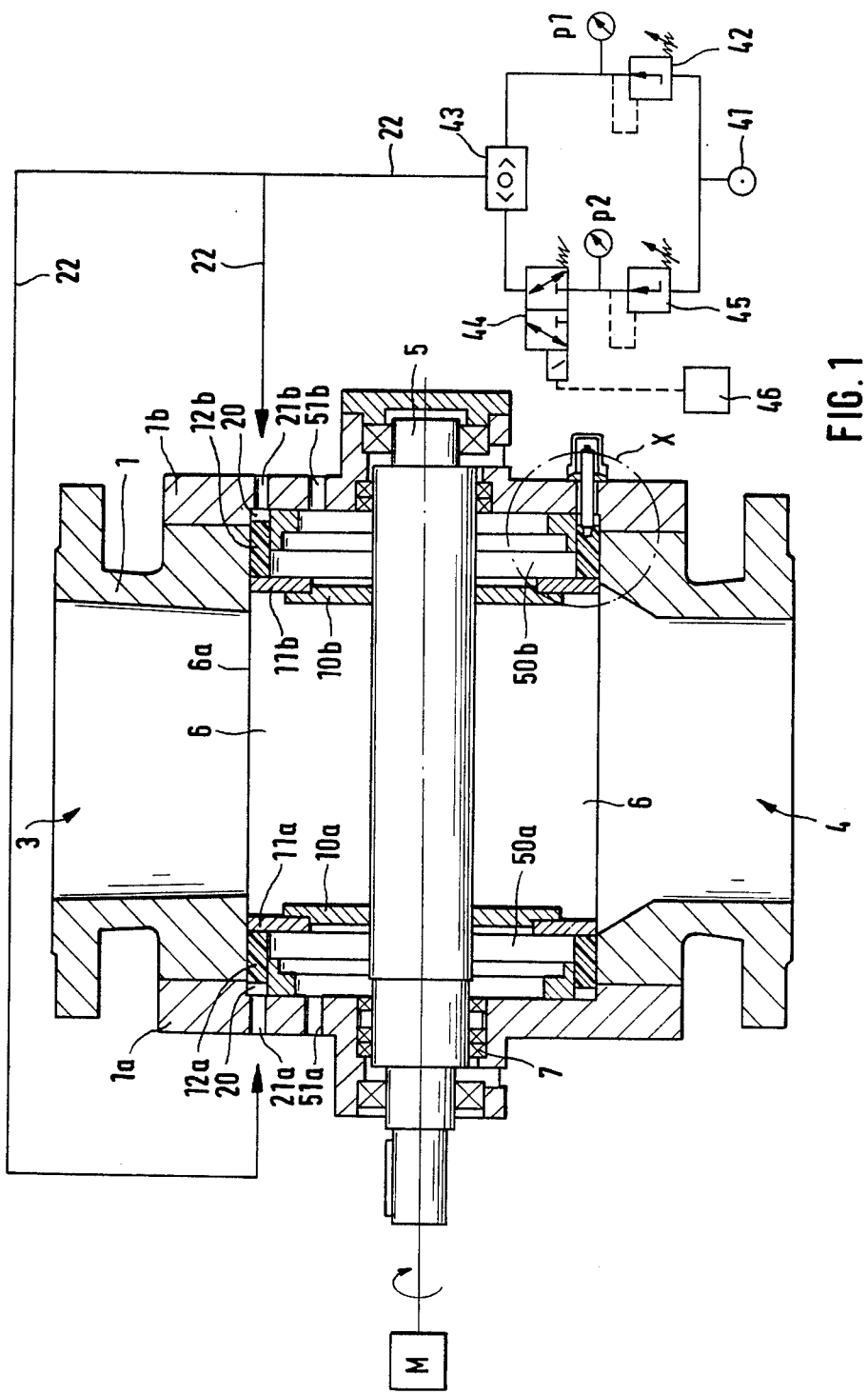
FIG. 1 is a longitudinal section of a rotary feeder for bulk material in accordance with the invention.

Referring now to the drawing, and in particular to FIG. 1, there is shown a longitudinal section of one embodiment of an apparatus for feeding bulk material in form of a rotary feeder. The rotary feeder includes a housing 1 which defines an interior space and has a top inlet port 3 and a bottom outlet port 4. A cellular rotor is arranged in the interior space of the housing 1 and includes a plurality of vanes or blades 6 in the form of metallic plates which are fixedly mounted on a shaft 5 and bear with their peripheral radial end faces 6a against the inner wall surface of the housing 1. The shaft 5 is rotatably supported in sealed manner by suitable bearings 7 arranged in lateral bearing covers 1a, 1b on opposite sides of the housing 1 and is driven by a suitable motor M shown only schematically.

Figure 2:
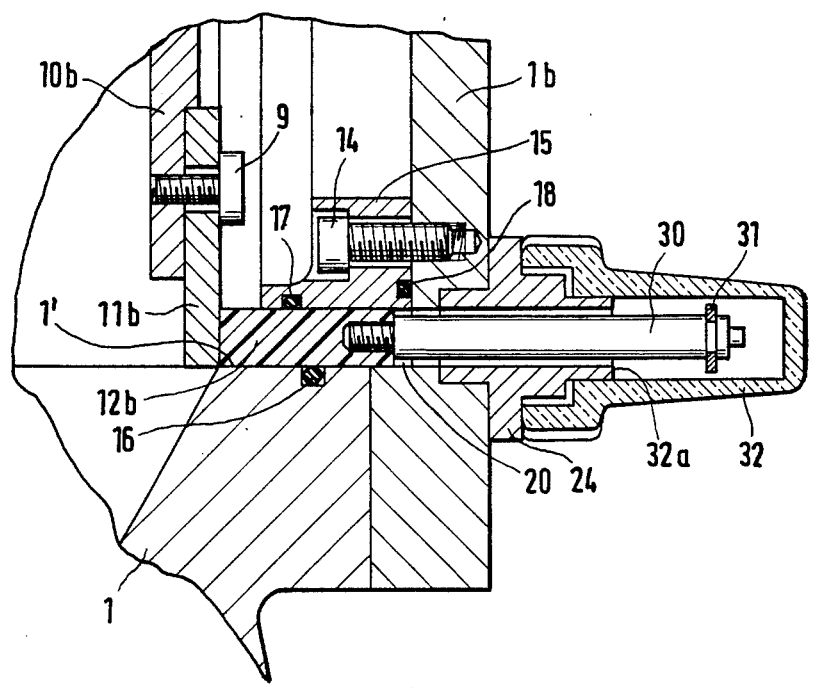
FIG. 2 is a cross sectional view on an enlarged scale according to section X in FIG. 1.

The vanes 6 of the cellular rotor extend between lateral disk members which consist of an inner circular plate 10a, 10b and an outer annular slide disk 11a, 11b. Each plate 10a, 10b is connected to the pertaining slide disk 11a, 11b by a suitable fastener such as bolt 9 as shown in FIG. 2. Bearing against the slide disks 11a, 11b are slide rings 12a, 12b to attain a sealing of the vanes 6 in axial direction. The slide rings 12a, 12b are made preferably of plastic material on a polytetrafluoroethylene (PTFE) base and each is of the annular piston type sealingly guided within an axial annular groove of the respective bearing cover 1a, 1b.

Turning now to FIG. 2 which shows on an enlarged scale a detail as designated by X in FIG. 1, it can be seen that the annular groove which contains the slide ring 12b is defined by the respective bearing cover 1b, the inner wall surface 1' of the housing 1 and a guide ring 15 which is threadably engaged with the bearing cover 1b by bolt 14. O-rings 16, 17, 18 provide a suitable sealing of the slide ring 12b and the guide ring 15.

With its outwardly directed end face which represents the piston head, each slide ring 12a, 12b defines with the base of each annular groove an annular chamber 20 (see also FIG. 1). According to a simplified embodiment of the present invention, each annular chamber 20 communicates via connection 21a, 21b and conduits 22 with a suitable compressed-air source such as compressed-air source 41. Suitably, the supply of compressed air into the annular chamber 20 is provided via a preset pressure reducing valve such as pressure regulator 42 so that the slide rings 12a, 12b are acted upon by a constant wear-independent and thus path-independent holding force or retaining force.

Taken into consideration that by the presence of the O-rings 16, 17, 18, the slide rings 12a, 12b are guided in their grooves at a certain friction which may actually increase during operation in view of unavoidable dust deposits account, it is preferred to subject the slide rings 12a, 12b not only to the constant wear-independent axial holding force but periodically also to a momentary displacement force which is higher than the holding force in order to ensure that the static friction which exceeds the sliding friction is overcome.

Thus, according to a preferred embodiment of the present invention as shown in FIG. 1, each conduit 22 is connected to the output of a pneumatic OR-element 43 whose one input is connected via the pressure regulator 42 to the compressed air source 41. The pressure in the compressed air source 41 is higher in comparison to the holding pressure $p_1$ which is set by the subsequent pressure regulator or pressure reducing valve 42 and corresponds to the holding force by which the slide rings 12a, 12b are pushed against the respective slide disks 11a, 11b to provide sufficient sealing and yet create only low wear of the slide rings 12a, 12b and of the slide disks 11a, 11b.

The second input of the OR-element 43 is connected to the compressed air source 41 via a further pressure regulator 45 which applies a displacement pressure $p_2$ which exceeds the holding pressure $p_1$. Interposed between the pressure regulator 45 and the OR-element 43 is a solenoid valve 44 which is momentarily energized at time intervals by a current impulse from an electric control circuit 46 so that the displacement pressure $p_2$ acts upon the slide rings 12a, 12b only momentarily.

At operation, the slide rings 12a, 12b are sufficiently kept against the slide disks 11a, 11b by the constant, circumferential holding force which is exerted independent of wear and of axial displacement of the slide rings 12a, 12b. At periodic intervals, the slide rings 12a, 12b are acted upon momentarily by the higher displacement force to ensure that frictional forces in view of dust particles accumulating between the slide rings 12a, 12b and the slide disks 11a, 11b or in the area of the guides for the slide rings 12a, 12b are sufficiently overcome.

Referring now again to FIG. 2, there can be seen that each of the slide rings 12a, 12b (only slide ring 12b is shown) is provided with a locking mechanism to prevent rotation thereof. The locking mechanism includes a bolt 30 which is screwed with its forward section into the slide ring 12b and projects with its remaining section through the bearing cover 1b toward the outside. The outwardly projecting section of the bolt 30 extends through an external support 24 which is suitably mounted to the outside of the bearing cover 1b. Attached to the support 24 is a transparent cap 32 which sealingly encloses the bolt 30.

At operation, the bolts 30 are moved with the slide rings 12a, 12b in axial direction so that the outwardly projecting section of the bolts 30 can be used as indication of progressing wear of the slide rings 12a, 12b. In order to limit the axial stroke or displacement of the slide rings 12a, 12b, each bolt 30 is provided at its rearward end with a disk-like stop member 31 which runs against a shoulder 32a of the support 24 when the slide rings 12a, 12b are essentially worn out. Since being sealingly enclosed by the cap 32, the rearward end face of each bolt 30 is subjected via the annular chamber 20 and the support 24 to compressed air at a same pressure as the slide rings 12a, 12b.

It will be appreciated that the bolt 30 may also be sealingly guided through the bearing cover 1b towards the outside without being enclosed by the cap 32. In this case, the bolt 30 is not acted upon by compressed air so that the slide ring 12b is pressure-relieved in the area where the bolt 30 is threadably engaged therewith.

As further shown in FIG. 1, the lateral disk members 10a, 10b, 11a, 11b of the rotor define with the respective bearing covers 1a, 1b chambers 50a, 50b which should be kept dust-free in order to prevent dust deposits on the guide surfaces of the slide rings 12a, 12b and on the bearings 7 of the shaft 5. Accordingly, these chambers 50a, 50b contain a barrier in form of a pressure fluid admitted through connections 51a, 51b in the bearing covers 1a, 1b. Pressure fluid such as compressed air may be used which suitably could be supplied from the compressed-air source 41 as long as its pressure is higher than the highest pressure prevailing in the interior space of the rotor.

While the invention has been illustrated and described as embodied in an Apparatus for Feeding Bulk Material, it is not intended to be limited to the details shown since various modifications and structural changes may be made without departing in any way from the spirit of the present invention.

What is claimed as new and desired to be protected by Letters Patent is set forth in the appended claims.

we claim:

1. Apparatus for feeding bulk material; comprising:
   a housing including two lateral bearing covers defining an interior space, said housing being provided with an inlet and an outlet;
   a rotor accommodated within said interior space of said housing and having a shaft supported in said bearing covers and a plurality of radially extending vanes mounes on said shaft to define compartments for transporting the bulk material from said inlet to said outlet;
   sealing means for axially sealing said rotor in said housing, said sealing means including lateral disk members arranged on said shaft and confining axial extension of said vanes, and slide rings axially slidable in non-rotational manner and respectively bearing against said disk members; and
   force-applying means acting on said slide rings for pressing said against said disk members by a constant holding force, said force-applying means including a pneumatically controlled OR-element with an output communicating with each of said slide rings, a first input being energized by a predetermined contact pressure which corresponds to said holding force and by which said slide ring is pressed against the respective disk member and a second input being energized momentarily by a predetermined displacement force which exceeds the holding force.

2. Apparatus as defined in claim 1 wherein each of said disk members includes an end face facing said bearing covers, said slide rings bearing against a peripheral area of said end face of said disk members.

3. Apparatus as defined in claim 1 wherein said force-applying means includes a pressure fluid source supplying a pressure fluid, each of said slide rings being acted upon by said pressure fluid so as to be pressed against said disk members.

4. Apparatus as defined in claim 3 wherein said force-applying means further includes a pressure regulator operatively connected with said pressure source for supplying pressure fluid at a pressure in correspondence with said holding force.

5. Apparatus as defined in claim 3 wherein each of said bearing covers has an axial annular groove defining a groove base, said slide rings being designed as an annular piston and sealingly guided respectively in said annular grooves wherein an annular space is defined between an annular end face of said slide rings and the groove base of said annular grooves, said pressure fluid being admitted to said annular space via a connection in said bearing covers.

6. Apparatus as defined in claim 1, and further comprising locking means for preventing rotation of each slide ring, said locking means including a bolt connected in force-locking manner with said slide ring and projecting outwardly beyond said associated bearing cover for allowing indication of wear of said slide ring.

7. Apparatus as defined in claim 6 wherein said bolt is provided at its rearward end with a disk-like stop member for limiting displacement and stroke of said slide ring.

8. Apparatus as defined in claim 7, and further comprising a transparent cap connected in pressure-sealed manner with said bearing cover and enclosing said bolt along its section projecting outwardly beyond said bearing cover.

9. Apparatus as defined in claim 8, and further comprising a support externally attached to the bearing covers for supporting said bolt, said support being connected with said transparent cap and defining a shoulder with which said stop member cooperates.

10. Apparatus as defined in claim 1 wherein said force-applying means includes a solenoid valve operatively connected to said second input of said OR-element to momentarily provide said displacement force.

11. Apparatus as defined in claim 1 wherein said bearing covers define with said disk members chambers which contain a barrier fluid at a pressure greater than the highest pressure within said interior space of said housing.

12. Apparatus for feeding bulk material; comprising:
    a housing having an inlet and an outlet and including two lateral bearing covers defining an interior space and each having an axial annular groove which defines a groove base;
    a rotor accommodated within said interior space of said housing and having a shaft supported in said bearing covers and a plurality of radially extending vanes mounted on said shaft to define compartments for transporting the bulk material from said inlet to said outlet;
    sealing means for axially sealing said rotor in said housing, said sealing means including lateral disk members arranged on said shaft and confining axial extension of said vanes, and slide rings axially slidable in non-rotational manner and respectively bearing against said disk members;
    force-applying means including a pressure fluid source which supplies a pressure fluid to act uon said slide rings for pressing same against said disk members by a constant holding force,
    said slide rings being designed as an annular piston and sealingly guided in said annular grooves of said bearing covers wherein an annular space is defined between an annular end face of said slide rings and the groove base of said annular grooves, said pressure fluid being admitted to said annular space via a connection in said bearing covers.

13. Apparatus for feeding bulk material; comprising:
    a housing including two lateral bearing covers defining an interior space, said housing being provided with an inlet and an outlet;

a rotor accommodated within said interior space of said housing and having a shaft supported in said bearing covers and a plurality of radially extending vanes mounted on said shaft to define compartments for transporting the bulk material from said inlet to said outlet;

sealing means for axially sealing said rotor in said housing, said sealing means including lateral disk members arranged on said shaft and confining axial extension of said vanes, and slide rings axially slidable in non-rotational manner and respectively bearing against said disk members;

force-applying means acting on said slide rings for pressing said against said disk members by a constant holding force;

locking means for preventing rotation of each slide ring, said locking means including a bolt connected in force-locking manner with said slide ring and projecting outwardly beyond said associated bearing cover for allowing indication of wear of said slide ring; and a transparent cap connected in pressure-sealed manner with said bearing cover and enclosing said bolt along its section projecting outwardly beyond said bearing cover.

14. Apparatus for feeding bulk material; comprising:
a housing having an inlet and an outlet;
a rotor accommodated in said housing and having a plurality of radially extending vanes to define compartments for transporting the bulk material from said inlet to said outlet;
sealing means for axially sealing said rotor; and
force-applying means acting upon said sealing means with a uniform and constant holding force and subjecting said sealing means in periodic intervals momentarily to a predetermined displacement force which exceeds the holding force.

15. Apparatus as defined in claim 14 wherein said force-applying means includes a pneumatically controlled OR-element having an output operatively connected with said sealing means, a first input energized by a predetermined contact pressure which corresponds to said holding force by which said sealing means is pressed into sealing contact with said rotor and a second input being energized momentarily by the predetermined displacement force.

16. Apparatus as defined in claim 15 wherein said force-applying means includes a solenoid valve operatively connected to said second input of said OR-element to momentarily provide said displacement force.

* * * * *

UNITED STATES PATENT AND TRADEMARK OFFICE
CERTIFICATE OF CORRECTION

PATENT NO. : 4,946,078

DATED : August 7, 1990

INVENTOR(S) : Dieter HEEP, Paul VOGEL, Joachim SCHMALZ

It is certified that error appears in the above-identified patent and that said Letters Patent is hereby corrected as shown below:

Column 5, line 32, change "mounes" to -- mounted --;

Column 5, line 42, change "said" (1st occurance) to --same--;

Column 6, line 55, change "uon" to -- upon --;

Column 7, line 14, change "said" (1st occurance) to --same--.

Signed and Sealed this

Seventh Day of January, 1992

Attest:

HARRY F. MANBECK, JR.

*Attesting Officer*     *Commissioner of Patents and Trademarks*